United States Patent Office 2,919,253
Patented Dec. 29, 1959

2,919,253

STYRENATED OIL-MODIFIED ALKYD RESINS MODIFIED WITH DIVINYL BENZENE AND THE PROCESS OF PREPARING SAME

William F. Hart, Darien, Conn., assignor to American Cyanamid Company, New York, N.Y., a corporation of Maine No Drawing. Application August 27, 1954
Serial No. 452,711

15 Claims. (Cl. 260—22)

This invention relates to modified alkyd resins and to the process of preparing the same. More particularly, this invention relates to the process of reacting certain styrene monomers with a glyceride oil-modified alkyd resin wherein the styrene monomer contains in admixture therewith small amounts of divinyl benzene in the order of magnitude of about 0.3% to about 1% by weight based on the total weight of the alkyd resin solids and the styrene.

One of the objects of the present invention is to produce a modified alkyd resin which has unusual clarity of solution and film. A further object of the present invention is to produce a styrenated alkyd resin which contains as a modifier relatively small amounts of divinyl benzene. A further object of the present invention is to produce coating resins using styrene and a small amount of divinyl benzene coreacted with a glyceride oil-modified alkyd resin. A further object of the present invention is to react a styrene with a glyceride oil in the presence of a small amount of divinyl benzene and thereafter adding a polycarboxylic acid and a polyhydric alcohol and esterifying the same to produce a post-formed alkyd resin. These and other objects of the present invention will be discussed more fully hereinbelow.

The oil-modified alkyd resins which may be used in the process of the present invention are the conventional type of alkyd resins prepared by coreacting a polycarboxylic acid, a glyceride oil introduced partly or wholly in the form of a fatty acid derived therefrom or a monoglyceride derived therefrom and a saturated aliphatic polyhydric alcohol at an elevated temperature until esterification is substantially complete. At least 90% by weight of the polycarboxylic acid component should consist of a polycarboxylic acid free of non-benzenoid unsaturation, preferably phthalic, although others may be employed. The remainder of the polycarboxylic acid may or may not be unsaturated. Amongst the polycarboxylic acids that are free from non-benzenoid unsaturation which may be used are oxalic, malonic, succinic, glutaric, sebacic, adipic, pimelic, suberic, azelaic, tricarballylic, citric, tartaric, malic, and the like. Wherever available, the anhydrides of these acids may be used. Still further, these acids or their anhydrides may be used singly or in combination with one another. In addition to the polycarboxylic acids which are free of non-benzenoid unsaturation, one may use small amounts not exceeding about 10% by weight based on the total weight of the acids of ethylenically unsaturated alpha-beta-polycarboxylic acids such as maleic, fumaric, aconitic, itaconic and the like. Additionally, wherever available, the anhydrides of these acids may be used. Still further, these acids or their anhydrides may be used either singly or in combination with one another.

Amongst the polyhydric alcohols which may be used in preparing the alkyd resins of the present invention are ethylene glycol, diethylene glycol, propylene glycol, dipropylene glycol, or the polyglycols, such as hexaethylene glycol, glycerin, trimethylol propane, trimethylol ethane, pentaerythritol, dipentaerythritol and the like. These polyhydric alcohols may be used either singly or in combination with one another.

The oil constituent of the alkyd resin is a glyceride oil either of the drying, semi-drying or non-drying oil types. In addition to using the oils or in substitution therefor, one may use the fatty acids derived therefrom, or one may utilize their monoglycerides. Amongst the various oils which may be used either singly or in combination with one another as modifiers for the alkyd resin are, china wood oil, dehydrated castor oil, raw castor oil, linseed oil, perilla oil, soya oil, corn oil, cottonseed oil, tall oil, distilled tall oil fatty acids, coconut oil, palm kernel oil, babassu oil, murumuru oil, palm oil, rape seed oil, mustard seed oil, olive oil, peanut oil, sunflower oil, walnut oil, tongue oil, oiticica oil, and the like. Certain animal or fish oils falling in the same category may be used, for instance, whale oil, menhaden oil, sardine oil, herring oil, and the like. It is desirable to use a sufficient amount of oil in modifying the alkyd resin so that the said modified alkyd resin will have an oil length in either the medium or the long oil categories. In the medium oil alkyd resins the total amount of phthalic anhydride or its equivalent in the alkyd resin will vary between about 32 and 36% by weight, whereas in the long oil alkyd resins, the total amount of phthalic anhydride or its equivalent will vary between about 20 and 26% by weight based on the total weight of the resin solids.

In order to obtain the products of the present invention in a minimum of processing time, a catalyst should be used in the polymerization of the styrene-type compound with the oil or the oil-modified alkyd resin. The amount of catalyst may vary from about 0.5% to about 5% by weight based on the total weight of the coreaction materials. From an optimum viewpoint, it is preferred to use from about 1% to about 2% of catalyst. Amongst the catalysts which may be used in the interpolymerization step are 2,2-bis(tertiary butyl peroxy)butane, tertiary butyl hydroperoxide, ditertiary butyl peroxide, tertiary butyl propylperoxide, tertiary butyl pentamethylethyl peroxide, and the like.

In the place of monomeric styrene per se, one may use the ring-substituted styrenes such as the ring-substituted alkyl styrenes and the ring-substituted chloro styrenes, such as the mono- and dialkyl styrenes, such as methyl styrene, dimethyl styrene, methylethyl styrene, diethyl styrenes and the chloro styrenes, such as dichloro styrene and the chloroalkyl substituted styrenes such as the methylchloro styrenes and the ethylchloro styrenes and the like. More specifically, these styrenes are the o-, m- or p-methyl, or ethyl, or propyl, styrenes, or the 2,4-dimethyl styrene, 2,5-dimethyl styrene, 3,4-dimethyl styrene, 2,4-diethyl styrene, 3,4-diethyl styrene, and the like. In the chloro styrenes, more specifically, they are the o-, m- or p-chloro styrene or the 2,4-dichloro styrene, 2,5-dichloro styrene, 3,4-dichloro styrene and the like.

Amongst the solvents which may be used in the practice of the process of the present invention are those inert solvents which are mutually solvent to the monomeric material as well as to the oil-modified alkyd resin. As examples of these solvents are xylol, toluol, kerosene, ultrasene, Varsol #1, Varsol #2, Solvesso #100, Solvasol #75 and the like. If, in the practice of the present invention, the oil-modified alkyd resin is prepared before the monomeric materials are polymerized with the said alkyd resin, it is desired to use the inert solvent in the styrenation step. On the other hand, if the styrene-type material is polymerized with the oil, oil acid or monoglyceride, an inert solvent may be used, but it is preferred that no solvent be used.

In order that the present invention may be more completely understood, the following examples are set forth in which all parts are parts by weight. It should be remembered that these examples are set forth primarily for the purpose of illustration and any specific enumeration of detail contained therein should not be interpreted as a limitation on the case except as is indicated in the appended claims.

RESIN A

Into a suitable reaction vessel, equipped with thermometer, stirrer and reflux condenser, there is introduced 2000 parts of linseed oil monoglyceride, 50 parts of glycerin (98%) and 815 parts of phthalic anhydride. The charge is heated to about 261° C. and maintained at that temperature for about 5 hours. The resulting oil-modified alkyd resin had an acid number of 11.5 and a 60% solids solution of the resin in xylol had a viscosity of A–B on the Gardner-Holdt scale at 25° C. and a color of 8–9, Gardner-1933.

Example 1

60 parts of the alkyd resin prepared according to Resin A and 100 parts of xylol are introduced into a suitable reaction vessel equipped with thermometer, stirrer and reflux condenser and the charge is heated to the reflux temperature, namely 142° C., whereupon a mixture of 38.9 parts of styrene, 1.23 parts of divinylbenzene and 1 part of tertiary butyl hydroperoxide is added in small increments over a period of about 1 hour. The charge temperature is maintained at reflux during the addition and when the addition is completed, the reaction vessel is continued at the reflux temperature for a period of about 5 hours and 50 minutes. The appearance of the solution is clear and the appearance of a film drawn down therefrom is also clear. The viscosity of a 50% solids solution of the resin in xylol is N–O on the Gardner-Holdt scale and had a color of 6, Gardner-1933. The tack-free time of the resin in film formation is 30 minutes.

RESIN B 287 parts of Acintol FA #2, 106 of glycerin (98%) and 148 parts of phthalic acid anhydride are introduced into a suitable reaction vessel equipped with thermometer, stirrer and reflux condenser and heated up to a temperature of about 260° C. and maintained at that temperature for about four hours and 15 minutes.

Example 2

60 parts of the alkyd resin B thus produced and 100 parts of xylol are introduced into a suitable reaction vessel equipped with thermometer, stirrer and reflux condenser and are heated to about 140° C., whereupon a mixture of 38.5 parts of styrene, 1.8 parts of divinylbenzene and 1 part of tertiary butyl hydroperoxide are added in small increments over about a 1-hour period while maintaining the temperature substantially at reflux. After the monomer addition is completed, the temperature is maintained at reflux for approximately 6 hours and 40 minutes. The viscosity of a 50% solids solution in xylol is N+; the color is 4–5, Gardner-1933 and the conversion of monomer to polymer is 99.7%. The solution is clear and the film produced therefrom is clear. The film dried to a tack-free condition in 13 minutes.

Example 3

55 parts (solids) of alkyd resin B and 66.7 parts of xylol are introduced into a suitable reaction vessel and the temperature is raised to 144° C., whereupon a mixture of 44.5 parts of styrene, 0.877 part of divinylbenzene, and 1 part of tertiary butyl hydroperoxide is added slowly over a 1-hour period. The heating is continued after the addition is completed for about 6 hours and 15 minutes. The viscosity of the 60% solids solution in xylol is W+ on the Gardner-Holdt scale at 25° C.; the color is 5+, Gardner-1933; the solution is clear and the film drawn down therefrom is clear. The film dried to a tack-free condition in 6 minutes.

Example 4

Into a suitable reaction vessel equipped with thermometer, stirrer and reflux condenser, there is introduced 45 parts solids of the alkyd resin B and 66.7 parts of xylol. The charge is heated to 144° C. and there is added thereto a mixture of 44.4 parts of styrene, 1.05 parts of divinylbenzene and 1 part of tertiary butyl hydroperoxide. The addition is accomplished slowly over a 1-hour period and the heating is maintained at the reflux temperature during the addition. After the addition is completed, the temperature is maintained at reflux for about an additional five hours. The resin solution thus produced is clear. A 60% solids solution of the resin in xylol has a viscosity of X–Y on the Gardner-Holdt scale at 25° C., and a color of 5, Gardner-1933. A film produced therefrom was clear and dried to a tack-free condition in 5 minutes.

Example 5

Into a suitable reaction vessel equipped as before, there is introduced 55 parts of the alkyd resin prepared according to alkyd resin B and 66.7 parts of xylol. The charge is heated to the reflux temperature and while maintaining reflux, a mixture of 44.3 parts of styrene, 1.23 parts of divinylbenzene and 1 part of tertiary butyl hydroperoxide is introduced in small increments over a 1-hour period. After the addition is completed, heating is maintained at reflux for an additional 6 hours and 15 minutes. The solution thus produced was clear and a 60% solids solution in xylol had a viscosity of $Z_4$ on the Gardner-Holdt scale at 25° C. The color of the solution was 5, Gardner-1933. A film drawn down from the resinous solution was clear and had a tack-free time of 10 minutes.

RESIN C

Into a suitable reaction vessel, equipped as before for Resin B, there is introduced 362 parts of refined soya oil monoglyceride, 9 parts of glycerin (98%) and 148 parts of phthalic acid anhydride. The charge is heated to about 260° C. and maintained at that temperature for about 6½ hours. A sample of the alkyd resin thus produced was cut to 70% solids in xylol and was a clear solution. The viscosity of the solution thus prepared was K–L on the Gardner-Holdt scale at 25° C. and had a color of 10–11, Gardner-1933.

Example 6

60 parts of the alkyd resin prepared according to Resin C (solids) and 100 parts of xylol are introduced into a suitable reaction vessel equipped as before and the charge is heated to the reflux temperature whereupon a mixture of 39.5 parts of styrene, 0.88 part of divinyl benzene and 1 part of tertiary butyl hydroperoxide is introduced in small increments over a 1-hour period. After the charge has been completed the heating is maintained at reflux temperature for an additional 6 hours. The viscosity of a 50% solids solution of the resin in xylol was I–J on the Gardner-Holdt scale at 25° C., and had a color of 7, Gardner-1933. The appearance of the solution was clear and a film drawn down therefrom was also clear. The track-free time was 24 minutes.

Example 7

Into a suitable reaction vessel equipped as before, there is introduced 60 parts of the alkyd resin prepared according to Resin C and 100 parts of xylol. The charge is heated to the reflux temperature whereupon a mixture of 38.9 parts of styrene, 1.23 parts of divinylbenzene and 1 part of tertiary butyl hydroperoxide are introduced in small increments over a 1-hour period. When the monomer mixture addition has been completed, the charge is continued at the reflux temperature for 5 hours and 15 minutes. The viscosity of a 50% solids solution of the resin in xylol was P on the Gardner-Holdt scale at 25° C., the color was 6–7, Gardner-1933 and the appearance of the solution was clear. A film drawn down from the solution had a tack-free time of 25 minutes and had a clear appearance.

*Example 8*

Into a suitable reaction vessel equipped with thermometer, stirrer and reflux condenser, there is introduced 239 parts of Acintol FA #2 (the fatty acid fraction of tall oil doubly distilled). The charge is heated to 150° C., whereupon a mixture of 364 parts of styrene, 4.7 parts of divinylbenzene and 8.2 parts of tertiary butyl hydroperoxide are added in small increments over a period of about 3 hours. After the addition is completed, the charge is maintained at about 150° C. for an additional 2 hours. At the end of this time, the temperature is slowly raised to 200° C. while sparging. The charge is then cooled to about 150° C. and there is added 98 parts of glycerin (98%) and the temperature is held at about 220° C.–225° C. for about 2 hours, whereupon there is added 148 parts of phthalic anhydride. After the phthalic anhydride has been added, the temperature is maintained at about 230–240° C. until an acid number of about 3.9 is reached. This takes about 5 hours and 15 minutes after all of the phthalic anhydride has been added. A 60% solids solution of the resin thus produced in xylol had a viscosity of $Z_3$ on the Gardner-Holdt scale at 25° C. had a color of 5–6, Gardner-1933, had a clear appearance as a solution and as a film and the film dried to a tack-free condition in 20 minutes.

*Example 9*

Into a suitable reaction vessel equipped with thermometer, stirrer and reflux condenser, there is introduced 402 parts of Acintol FA #2, and the charge is heated to about 170° C., whereupon there is added in small increments a mixture of 582 parts of vinyl toluene, 7.2 parts of divinylbenzene and 18 parts of tertiary butyl hydroperoxide. The increment addition is completed at a temperature of about 170° C. in 3 hours. After the monomer mixture has been completely added, the temperature is gradually raised to about 200° C. in about 3 hours. There is then added to the reaction mixture, after the charge has been cooled to about 140° C., 104 parts of glycerin (98%) and 49.5 parts of pentaerythritol. The charge is gradually heated to about 220–225° C. and while holding at that temperature there is added 222 parts of phthalic anhydride. The reaction is continued until the resinous material has an acid number of about 7.8. The viscosity of a 50% solution of the resin in V.M. and P naphtha is about $Z_1$ on the Gardner-Holdt scale at 25° C. The appearance of the solution is clear and the color is 4–5, Gardner-1933. The tack-free time of a film is 35 minutes and the appearance of the film is clear.

The oil length of the alkyd resins in Examples 1, 2, 3, 4, 5, 6 and 7 is 300; the oil length of the post formed alkyd in Example 8 is 250; and the oil length of the post formed alkyd in Example 9 is 280.

In each of the examples set forth hereinabove, the divinyl benzene used is actually only 57% divinyl benzene, the remainder being 32% ethylvinyl benzene and 11% saturates such as benzene, toluene or xylene.

The amounts of the polyhydric alcohol and polycarboxylic acid used to prepare the alkyd resins of the present invention will be conventional as is known in the art. The amount of polyhydric alcohol should be about 10%–30% in excess of that amount stoichiometrically required to esterify the polycarboxylic acid.

I claim:

1. A process comprising heat-reacting a glyceride oil-modified alkyd resin with a mixture of (1) a member selected from the group consisting of styrene, ring-substituted alkyl styrenes and ring-substituted chlorostyrenes and (2) divinyl benzene in an inert organic solvent and in the presence of a catalyst selected from the group consisting of tertiary alkyl-substituted diperoxides and tertiary alkyl-substituted hydroperoxides, at about reflux temperature, wherein said divinyl benzene comprises about 0.3%–1.0% by weight based on the total weight of said alkyd resin and said styrene, wherein the peroxide group of said catalyst is directly attached to the tertiary group, wherein the polycarboxylic acid used in the preparation of the alkyd resin is comprised of at least 90% by weight of a polycarboxylic acid which is free of non-benzenoid unsaturation and said polycarboxylic acid which is free of non-benzenoid unsaturation is present in an amount varying between about 20% and 36% by weight based on the total weight of oil-modified alkyd resin solids, wherein the amount of polyhydric alcohol used to prepare said oil-modified alkyd resin is between about 10% and 30% in excess of that amount stoichiometrically required to esterify the polycarboxylic acid and wherein the styrene compound used to react with said oil-modified alkyl resin is present in minor amounts compared with the amount of oil-modified alkyd resin solids.

2. A process comprising heat-reacting a glyceride oil-modified alkyd resin with a mixture of (1) styrene and (2) divinyl benzene in an inert organic solvent and in the presence of a catalyst selected from the group consisting of tertiary alkyl-substituted diperoxides and tertiary alkyl-substituted hydroperoxides, at about reflux temperature, wherein said divinyl benzene comprises about 0.3%–1.0% by weight based on the total weight of said alkyd resin and said styrene, wherein the peroxide group of said cathalyst is directly attached to the tertiary group, wherein the polycarboxylic acid used in the preparation of the alkyd resin is comprised of at least 90% by weight of a polycarboxylic acid which is free of non-benzenoid unsaturation and said polycarboxylic acid which is free of nonbenzenoid unsaturation is present in an amount varying between about 20% and 36% by weight based on the total weight of oil-modified alkyd resin solids, wherein the amount of polyhydric alcohol used to prepare said oil-modified alkyd resin is between about 10% and 30% in excess of that amount stoichiometrically required to esterify the polycarboxylic acid and wherein the styrene compound used to react with said oil-modified alkyd resin is present in minor amounts compared with the amount of oil-modified alkyd resin solids.

3. A process comprising heat-reacting a soya oil-modified alkyd resin with a mixture of (1) styrene and (2) divinyl benzene in an inert organic solvent and in the presence of a catalyst selected from the group consisting of tertiary alkyl-substituted diperoxides and tertiary alkyl-substituted hydroperoxides, at about reflux temperature, wherein said divinyl benzene comprises about 0.3%–1.0% by weight based on the total weight of said alkyd resin and said styrene, wherein the peroxide group of said catalyst is directly attached to the tertiary group, wherein the polycarboxylic acid used in the preparation of the alkyd resin is comprised of at least 90% by weight of a polycarboxylic acid which is free of non-benzenoid unsaturation and said polycarboxylic acid which is free of nonbenzenoid unsaturation is present in an amount varying between about 20% and 36% by weight based on the total weight of oil-modified alkyd resin solids, wherein the amount of polyhydric alcohol used to prepare said oil-modified alkyd resin is between about 10% and 30% in excess of that amount stoichiometrically required to esterify the polycarboxylic acid and wherein the styrene compound used to react with said oil-modified alkyd resin is present in minor amounts compared with the amount of oil-modified alkyd resin solids.

4. A process comprising heat-reacting a glyceride oil-modified alkyd resin with a mixture of (1) a ring-substituted alkyl styrene and (2) divinyl benzene in an inert organic solvent and in the presence of a catalyst selected from the group consisting of tertiary alkyl-substituted diperoxides and tertiary alkyl-substituted hydroperoxides, at about reflux temperature, wherein said divinyl benzene comprises about 0.3%–1.0% by weight based on the total weight of said alkyd resin and said styrene, wherein the peroxide group of said catalyst is directly attached to the tertiary group, wherein the polycarboxylic acid used in the preparation of the alkyd resin is comprised of at least 90% by weight of a polycarboxylic acid which is free of non-benzenoid unsaturation and said polycarboxylic acid which is free of non-benzenoid unsaturation is present in an amount varying between about 20% and 36% by weight based on the total weight of oil modified alkyd resin solids, wherein the amount of polyhydric alcohol used to prepare said oil-modified alkyd resin is between about 10% and 30% in excess of that amount stoichiometrically required to esterify the polycarboxylic acid and wherein the styrene compound used to react with said oil-modified alkyd resin is present in minor amounts compared with the amount of oil-modified alkyd resin solids.

5. A process comprising heat-reacting a soya oil-modified alkyd resin with a mixture of (1) a ring-substituted alkyl styrene and (2) divinyl benzene in an inert organic solvent and in the presence of a catalyst selected from the group consisting of tertiary alkyl-substituted diperoxides and tertiary alkyl-substituted hydroperoxides, at about reflux temperature, wherein said divinyl benzene comprises about 0.3%–1.0% by weight based on the total weight of said alkyd resin and said styrene, wherein the peroxide group of said catalyst is directly attached to the tertiary group, wherein the polycarboxylic acid used in the preparation of the alkyd resin is comprised of at least 90% by weight of a polycarboxylic acid which is free of non-benzenoid unsaturation and said polycarboxylic acid which is free of non-benzenoid unsaturation is present in an amount varying between about 20% and 36% by weight based on the total weight of oil-modified alkyd resin solids, wherein the amount of polyhydric alcohol used to prepare said oil-modified alkyd resin is between about 10% and 30% in excess of that amount stoichiometrically required to esterify the polycarboxylic acid and wherein the styrene compound used to react with said oil-modified alkyd resin is present in minor amounts compared with the amount of oil-modified alkyd resin solids.

6. A process comprising heat-reacting a linseed oil-modified alkyd resin with a mixture of (1) styrene and (2) divinyl benzene in an inert organic solvent and in the presence of a catalyst selected from the group consisting of tertiary alkyl-substituted diperoxides and tertiary alkyl-substituted hydroperoxides, at about reflux temperature, wherein said divinyl benzene comprises about 0.3%–1.0% by weight based on the total weight of said alkyd resin and said styrene, wherein the peroxide group of said catalyst is directly attached to the tertiary group, wherein the polycarboxylic acid used in the preparation of the alkyd resin is comprised of at least 90% by weight of a polycarboxylic acid which is free of non-benzenoid unsaturation and said polycarboxylic acid which is free of non-benzenoid unsaturation is present in an amount varying between about 20% and 36% by weight based on the total weight of oil-modified alkyd resin solids, wherein the amount of polyhydric alcohol used to prepare said oil-modified alkyd resin is between about 10% and 30% in excess of that amount stoichiometrically required to esterify the polycarboxylic acid and wherein the styrene compound used to react with said oil-modified alkyd resin is present in minor amounts compared with the amount of oil-modified alkyd resin solids.

7. A process comprising heat-reacting a linseed oil-modified alkyd resin with a mixture of (1) a ring-substituted alkyl styrene and (2) divinyl benzene in an inert organic solvent and in the presence of a catalyst selected from the group consisting of tertiary alkyl-substituted diperoxides and tertiary alkyl-substituted hydroperoxides, at about reflux temperature, wherein said divinyl benzene comprises about 0.3%–1.0% by weight based on the total weight of said alkyd resin and said styrene, wherein the peroxide group of said catalyst is directly attached to the tertiary group, wherein the polycarboxylic acid used in the preparation of the alkyd resin is comprised of at least 90% by weight of a polycarboxylic acid which is free of non-benzenoid unsaturation and said polycarboxylic acid which is free of non-benzenoid unsaturation is present in an amount varying between about 20% and 36% by weight based on the total weight of oil-modified alkyd resin solids, wherein the amount of polyhydric alcohol used to prepare said oil-modified alkyd resin is between about 10% and 30% in excess of that amount stoichiometrically required to esterify the polycarboxylic acid and wherein the styrene compound used to react with said oil-modified alkyd resin is present in minor amounts compared with the amount of oil-modified alkyd resin solids.

8. A process comprising heat-reacting a glyceride oil-modified alkyd resin with a mixture of (1) a ring-substituted chlorostyrene and (2) divinyl benzene in an inert organic solvent and in the presence of a catalyst selected from the group consisting of tertiary alkyl-substituted diperoxides and tertiary alkyl-substituted hydroperoxides, at about reflux temperature, wherein said divinyl benzene comprises about 0.3%–1.0% by weight based on the total weight of said alkyd resin and said styrene, wherein the peroxide group of said catalyst is directly attached to the tertiary group, wherein the polycarboxylic acid used in the preparation of the alkyd resin is comprised of at least 90% by weight of a polycarboxylic acid which is free of non-benzenoid unsaturation and said polycarboxylic acid which is free of non-benzenoid unsaturation is present in an amount varying between about 20% and 36% by weight based on the total weight of oil-modified alkyd resin solids, wherein the amount of polyhydric alcohol used to prepare said oil-modified alkyd resin is between about 10% and 30% in excess of that amount stoichiometrically required to esterify the polycarboxylic acid and wherein the styrene compound used to react with said oil-modified alkyd resin is present in minor amounts compared with the amount of oil-modified alkyd resin solids.

9. A process comprising heat-reacting a glyceride oil-modified alkyd resin with a mixture of (1) a member selected from the group consisting of styrene, ring-substituted alkyl styrenes and ring-substituted chlorostyrenes and (2) divinyl benzene in an inert organic solvent and in the presence of tertiary butyl hydroperoxide, at about reflux temperature, wherein said divinyl benzene comprises about 0.3%–1.0% by weight based on the total weight of said alkyd resin and said styrene, wherein the peroxide group of said catalyst is directly attached to the tertiary group, wherein the polycarboxylic acid used in the preparation of the alkyd resin is comprised of at least 90% by weight of a polycarboxylic acid which is free of non-benzenoid unsaturation and said polycarboxylic acid which is free of non-benzenoid unsaturation is present in an amount varying between about 20% and 36% by weight based on the total weight of oil-modified alkyd resin solids, wherein the amount of polyhydric alcohol used to prepare said oil-modified alkyd resin is between about 10% and 30% in excess of that amount stoichiometrically required to esterify the polycarboxylic acid and wherein the styrene compound used to react with said oil-modified alkyd resin is present in minor amounts compared with the amount of oil-modified alkyd resin solids.

10. A process comprising heat-reacting a glyceride oil-modified alkyd resin with a mixture of (1) a member selected from the group consisting of styrene, ring-substituted alkyl styrenes and ring-substituted chlorostyrenes and (2) divinyl benzene in an inert organic solvent and in the presence of ditertiary butyl peroxide, at about reflux temperature, wherein said divinyl benzene comprises about 0.3%–1.0% by weight based on the total weight of said alkyd resin and said styrene, wherein the peroxide group of said catalyst is directly attached to the tertiary group, wherein the polycarboxylic acid used in the preparation of the alkyd resin is comprised of at least 90% by weight of a polycarboxylic acid which is free of non-benzenoid unsaturation and said polycarboxylic acid which is free of non-benzenoid unsaturation is present in an amount varying between about 20% and 36% by weight based on the total weight of oil-modified alkyd resin solids, wherein the amount of polyhydric alcohol used to prepare said oil-modified alkyd resin is between about 10% and 30% in excess of that amount stoichiometrically required to esterify the polycarboxylic acid and wherein the styrene compound used to react with said oil-modified alkyd resin is present in minor amounts compared with the amount of oil-modified alkyd resin solids.

11. A clear resinous solution comprising an inert organic solvent containing a glyceride oil-modified alkyd resin coreacted with a mixture of (1) a member selected from the group consisting of styrene, ring-substituted alkyl styrenes and ring-substituted chlorostyrenes and (2) divinyl benzene, wherein the divinyl benzene comprises about 0.3%–1.0% by weight based on the total weight of said alkyd resin and said styrene, wherein the polycarboxylic acid used in the preparation of the alkyd resin is comprised of at least 90% by weight of a polycarboxylic acid which is free of non-benzenoid unsaturation and said polycarboxylic acid which is free of non-benzenoid unsaturation is present in an amount varying between about 20% and 36% by weight based on the total weight of oil-modified alkyd resin solids, wherein the amount of polyhydric alcohol used to prepare said oil-modified alkyd resin is between about 10% and 30% in excess of that amount stoichiometrically required to esterify the polycarboxylic and acid wherein the styrene compound used to react with said oil-modified alkyd resin is present in minor amounts compared with the amount of oil-modified alkyd resin solids.

12. A clear resinous solution comprising an inert organic solvent containing a glyceride oil-modified alkyd resin coreacted with a mixture of (1) styrene and (2) divinyl benzene, wherein the divinyl benzene comprises about 0.3%–1.0% by weight based on the total weight of said alkyd resin and said styrene, wherein the polycarboxylic acid used in the preparation of the alkyd resin is comprised of at least 90% by weight of a polycarboxylic acid which is free of non-benzenoid unsaturation and said polycarboxylic acid which is free of non-benzenoid unsaturation is present in an amount varying between about 20% and 36% by weight based on the total weight of oil-modified alkyd resin solids, wherein the amount of polyhydric alcohol used to prepare said oil-modified alkyd resin is between about 10% and 30% in excess of that amount stoichiometrically required to esterify the polycarboxylic acid and wherein the styrene compound used to react with said oil-modified alkyd resin is present in minor amounts compared with the amount of oil-modified alkyd resin solids.

13. A clear resinous solution comprising an inert organic solvent containing a glyceride oil-modified alkyd resin coreacted with a mixture of (1) a ring-substituted alkyl styrene and (2) divinyl benzene, wherein the divinyl benzene comprises about 0.3%–1.0% by weight based on the total weight of said alkyd resin and said styrene, wherein the polycarboxylic acid used in the preparation of the alkyd resin is comprised of at least 90% by weight of a polycarboxylic acid which is free of non-benzenoid unsaturation and said polycarboxylic acid which is free of non-benzenoid unsaturation is present in an amount varying between about 20% and 36% by weight based on the total weight of oil-modified alkyd resin solids, wherein the amount of polyhydric alcohol used to prepare said oil-modified alkyd resin is between about 10% and 30% in excess of that amount stoichiometrically required to esterify the polycarboxylic acid and wherein the styrene compound used to react with said oil-modified alkyd resin is present in minor amounts compared with the amount of oil-modified alkyd resin solids.

14. A clear resinous solution comprising an inert organic solvent containing a glyceride oil-modified alkyd resin coreacted with a mixture of (1) a ring-substituted chlorostyrene and (2) divinyl benzene, wherein the divinyl benzene comprises about 0.3%–1.0% by weight based on the total weight of said alkyd resin and said styrene, wherein the polycarboxylic acid used in the preparation of the alkyd resin is comprised of at least 90% by weight of a polycarboxylic acid which is free of non-benzenoid unsaturation and said polycarboxylic acid which is free of non-benzenoid unsaturation is present in an amount varying between about 20% and 36% by weight based on the total weight of oil-modified alkyd resin solids, wherein the amount of polyhydric alcohol used to prepare said oil-modified alkyd resin is between about 10% nad 30% in excess of that amount stoichiometrically required to esterify the polycarboxylic acid and wherein the styrene compound used to react with said oil-modified alkyd resin is present in minor amounts compared with the amount of oil-modified alkyd resin solids.

15. A process comprising heat-reacting a glyceride oil with a mixture of (1) a member selected from the group consisting of styrene, ring-substituted alkyl styrenes and ring-substituted chlorostyrenes and (2) divinyl benzene at about reflux temperature, wherein said divinyl benzene comprises about 0.3%–1.0% by weight of said styrene, until polymerization is substantially complete, thereafter adding an aliphatic saturated polyhydric alcohol and a polycarboxylic acid comprising at least 90% by weight of a polycarboxylic acid free of non-benzenoid unsaturation and in an amount sufficient to provide between about 20% and 36% by weight based on the total weight of oil-modified alkyd resin solids and heat-reacting the mixture until esterification is substantially complete, wherein the amount of polyhydric alcohol used in the reaction is between about 10% and 30% in excess of that amount stoichiometrically required to esterify the polycarboxylic acid and wherein the amount of styrene compound utilized is in a minor amount compared to the total weight of the post-formed oil-modified alkyd resin solids.

References Cited in the file of this patent

UNITED STATES PATENTS

| | | |
|---|---|---|
| 2,495,458 | Kanning et al. | Jan. 24, 1950 |
| 2,590,653 | Schmutzler | Mar. 25, 1952 |
| 2,600,457 | Wynstra | June 17, 1952 |
| 2,609,353 | Rubens et al. | Sept. 2, 1952 |
| 2,646,416 | Parker | July 21, 1953 |
| 2,647,092 | Meeske | July 28, 1953 |